US006809287B2

(12) United States Patent
Lin et al.

(10) Patent No.: US 6,809,287 B2
(45) Date of Patent: Oct. 26, 2004

(54) AC PLASMA DISPLAY PANEL

(75) Inventors: Chu-Shan Lin, Hsinchu (TW); Bing-Ming Ho, Chiai Hsien (TW); Jin-Yuh Lu, Taipei (TW)

(73) Assignee: Au Optronics Corp., Hsinchu (TW)

( * ) Notice: Subject to any disclaimer, the term of this patent is extended or adjusted under 35 U.S.C. 154(b) by 333 days.

(21) Appl. No.: 10/157,512

(22) Filed: May 28, 2002

(65) Prior Publication Data

US 2002/0179579 A1 Dec. 5, 2002

(30) Foreign Application Priority Data

May 30, 2001 (TW) ....................................... 90113097 A

(51) Int. Cl.$^{7}$ ................................................ B23K 10/00

(52) U.S. Cl. .............................. 219/121.52; 315/169.1; 345/60; 345/61

(58) Field of Search ........................ 219/121.48, 121.52; 345/60, 63, 66, 67, 55, 76; 315/169.1, 169.3; 313/581–582

(56) References Cited

U.S. PATENT DOCUMENTS 5,828,353 A * 10/1998 Kishi et al. .................... 345/55
6,608,609 B1 * 8/2003 Setoguchi et al. ............ 345/60
6,747,714 B2 * 6/2004 Okumura ..................... 349/61

* cited by examiner

*Primary Examiner*—Quang T. Van
(74) *Attorney, Agent, or Firm*—Ladas & Parry LLP

(57) ABSTRACT

An AC plasma display panel of the present invention changes the conventional disposition of three electrodes. Either the scanning electrode or sustaining electrode is disposed in the rib or on the sidewall of the rib. Also, two scanning electrodes both use the same sustaining electrode disposed on the rib. Thus, a high resolution and high precision AC plasma display panel can be obtained.

9 Claims, 10 Drawing Sheets

AC PLASMA DISPLAY PANEL

BACKGROUND OF THE INVENTION

1. Field of the Invention

The present invention relates to an AC plasma display panel, and more particularly to an AC plasma display panel in which two scanning electrodes both use the same sustaining electrode.

2. Description of the Prior Art

FIG. 1 is a cross-section showing the structure of a conventional AC plasma display panel. The AC plasma display panel, hereinafter abbreviated to AC PDP, includes upper and lower portions. In the upper portion, a pair of upper electrodes 4 serving as a scanning electrode (Y) and sustaining electrode (X) are formed on a front glass substrate 1. An inductive layer 2 is formed by printing on the upper electrodes 4. In addition, a protective layer 3 is formed on the inductive layer 2. In the lower portion, a lower electrode 12 is formed on a rear glass substrate 11 to serve as an address electrode. The space between the front glass substrate 1 and rear glass substrate 11 constitutes a discharge space. Ribs (Partition walls) 6 are formed in the discharge space to prevent cross talk between adjacent plasma display unit cells. In addition, fluorescent body 8 is coated on the ribs 6 and lower electrode 12. Discharging gas such as helium (He), neon (Ne) or xenon (Xe) is filled in the discharge space.

During the sustaining period of the AC PDP, driving voltage is applied to the upper electrodes 4, and a plasma discharging region 5 is thus formed. The plasma discharging region 5 is roughly parallel to the front glass substrate 1 and is close to a plane shape. Surface discharge occurs and ultraviolet ray 7 is generated. The ultraviolet ray 7 excites the fluorescent body 8 to cause the fluorescent body 8 to emit visible light.

In a conventional AC PDP, each upper electrode 4 (X or Y electrode) is constituted by a transparent electrode such as ITO and a bus electrode such as Cr/Al/Cr or Cr/Cu/Cr. Since the bus electrode is not transparent, the aperture ratio of AC PDP is affected.

In the conventional AC PDP, since the plasma discharging region 5 is roughly parallel to the front glass substrate 1, the ultraviolet ray 7 generated during the discharging period cannot effectively spread in the discharge space between the front and rear glass substrates 1 and 11. Thus, the visible light emission efficiency of fluorescent body is affected.

In the conventional AC PDP, the upper electrodes 4 (X and Y electrodes) are disposed on the front glass substrate 1. If the gap between X and Y electrodes is adjusted according to requirements, the pitch between ribs 6 must also be adjusted. This is detrimental to the gap adjustment of X and Y electrodes. In addition, when the gap between X and Y electrodes is increased, the pitch between ribs 6 must be also increased. For the AC PDP with set sized display units, since the pixel units on the address electrode direction decrease, the integral resolution of AC PDP decreases.

SUMMARY OF THE INVENTION

The main object of the present invention is to provide a novel AC plasma display panel. The present invention changes the conventional disposition of three electrodes. Either the scanning electrode or sustaining electrode is disposed in the rib or on the sidewall of the rib. Thus, the gap between the scanning electrode and sustaining electrode can be easily adjusted. This is beneficial to high resolution and high precision AC plasma display panel fabrication.

Another object of the present invention is to provide a novel AC plasma display panel by changing the conventional disposition of three electrodes. The scanning electrode and sustaining electrodes are disposed on different planes. Thus, the plasma discharge region is generated by a predetermined inclined angle relative to the front glass substrate. Therefore, the ultraviolet ray generated can effectively and completely spread in the discharge space between the front and rear glass substrates.

A further object of the present invention is to provide a novel AC plasma display panel by changing the conventional disposition of three electrodes. Either the scanning electrode or sustaining electrode is disposed in the rib or on the sidewall of the rib. This prevents the shielding effect caused by the opaque component in the sustaining (or scanning) electrode; thus, the aperture ratio is increased.

A still further object of the present invention is to provide a novel AC plasma display panel. Either the scanning electrode or sustaining electrode is disposed in the rib, and two scanning electrodes both use the same sustaining electrode disposed on the rib. Thus, the sustaining electrode number can be reduced by half, and the sustaining driving integrated circuit number can also be decreased. The production cost can thus be decreased.

To achieve the above objects, the main feature of the present invention resides in that either the sustaining electrode or scanning electrode is disposed in the rib or on the sidewall of the rib. The AC plasma display panel of the present invention includes: a first substrate; a first electrode ($A_1$) disposed on the first substrate along a first direction; a second substrate disposed parallel to the first substrate, such that a discharge space is formed between the first substrate and the second substrate; a first strip-shaped rib ($R1_j$) and a second strip-shaped rib ($R2_k$) parallel to each other along the first direction and alternatively disposed in the discharge space, wherein the first strip-shaped rib ($R1_j$) is provided with a second electrode ($B_j$), the second strip-shaped rib ($R2_k$) does not have a conductive portion, and the first electrode ($A_i$) is located between the first strip-shaped rib ($R1_j$) and the second strip-shaped rib ($R2_k$) and is not located on the same plane as the second electrode ($B_j$); and a third electrode ($D_m$) disposed on the second substrate along a second direction approximately perpendicular to the first direction.

When the AC plasma display plane undergoes sustaining discharge, the sustaining discharge is achieved by biasing the second electrode ($B_j$) and two adjacent first electrodes ($A_i$), and plasma is generated with a predetermined inclined angle relative to the first substrate.

To achieve the above objects, the main feature of the present invention resides in that the sustaining electrode and scanning electrode are disposed on different planes of the first substrate, and either the sustaining electrode or scanning electrode is disposed above the rib. The AC plasma display panel of the present invention includes: a first substrate; a first electrode ($A_i$) disposed on the first substrate along a first direction; a second substrate disposed parallel to the first substrate, such that a discharge space is formed between the first substrate and the second substrate; a first strip-shaped rib ($R1_j$) and a second strip-shaped rib ($R2_2$) parallel to each other along the first direction and alternatively disposed in the discharge space, wherein the first electrode ($A_i$) is located between the first strip-shaped rib ($R1_j$) and the second strip-shaped rib ($R2_k$); a second electrode ($B_j$) disposed in the first substrate along the first direction, on the corresponding location of the first strip-shaped rib ($R1_j$), and not on the same plane as the first electrode ($A_i$); and a third electrode ($D_m$) disposed on the second substrate along a second direction approximately perpendicular to the first direction.

When the AC plasma display plane undergoes sustaining discharge, the sustaining discharge is achieved by biasing the second electrode ($B_j$) and two adjacent first electrodes ($A_i$), and plasma is generated with a predetermined inclined angle relative to the first substrate.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
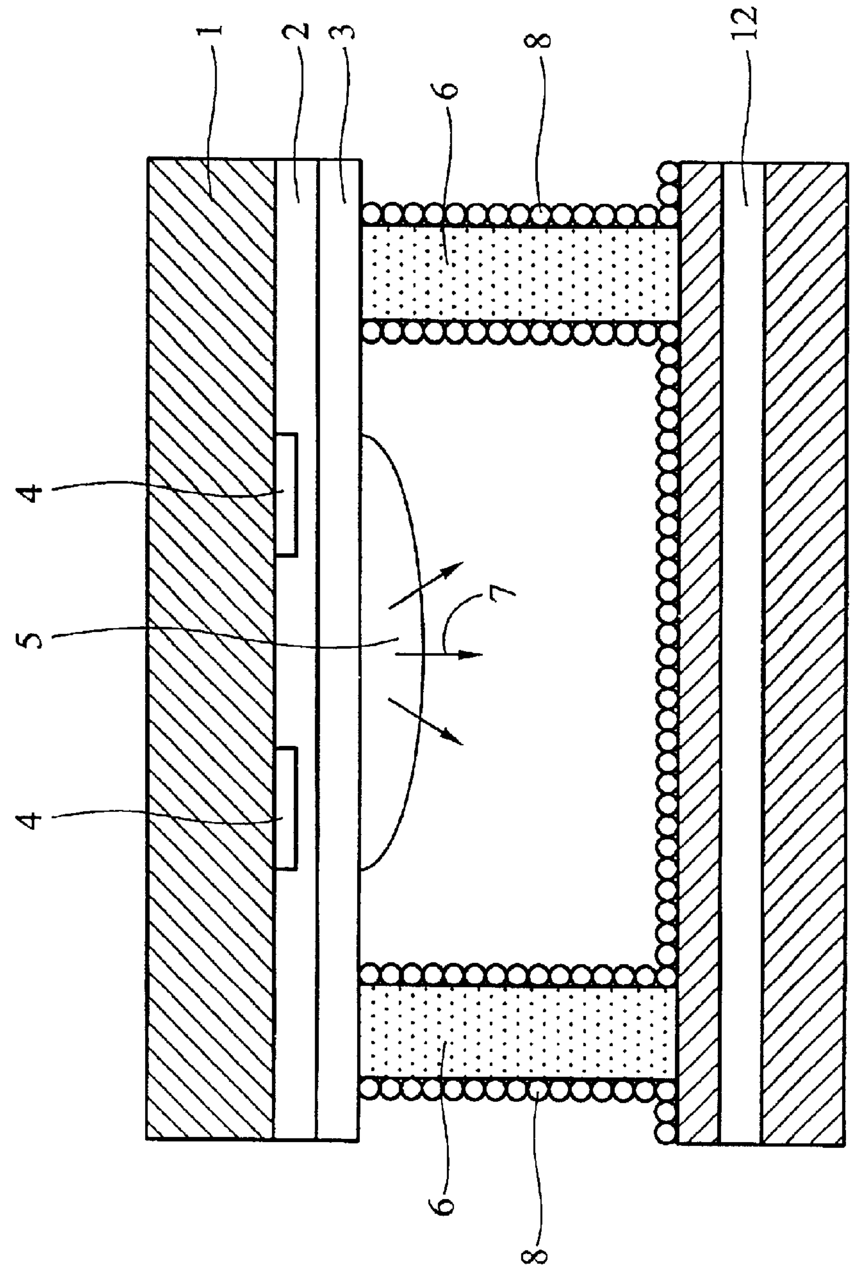
FIG. 1 (PRIOR ART)
FIG. 1 is a cross-section showing the structure of a conventional AC plasma display panel.
Figure 2:
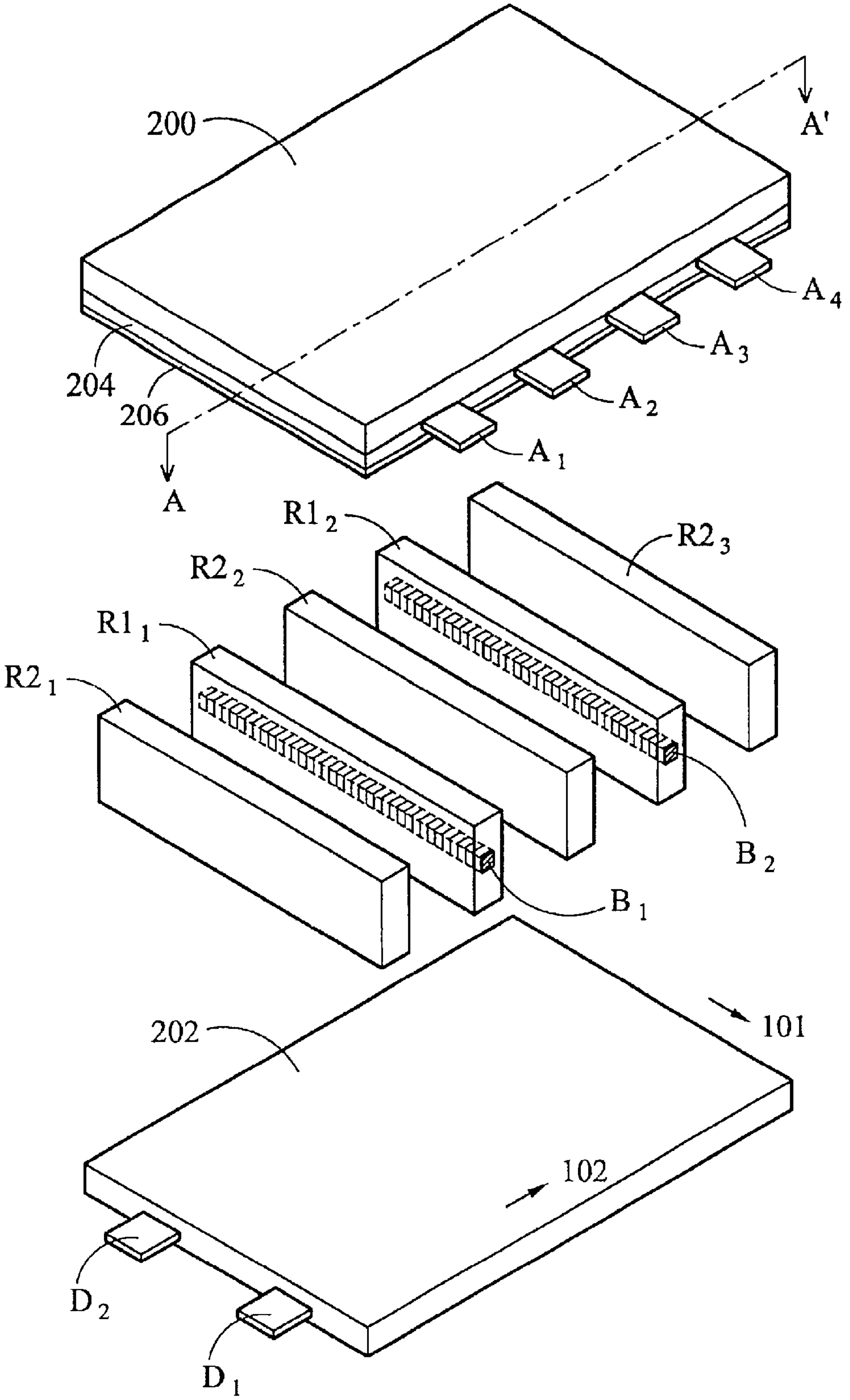
FIG. 2 is a cross-section showing the AC plasma display panel structure of the present invention.
Figure 3:
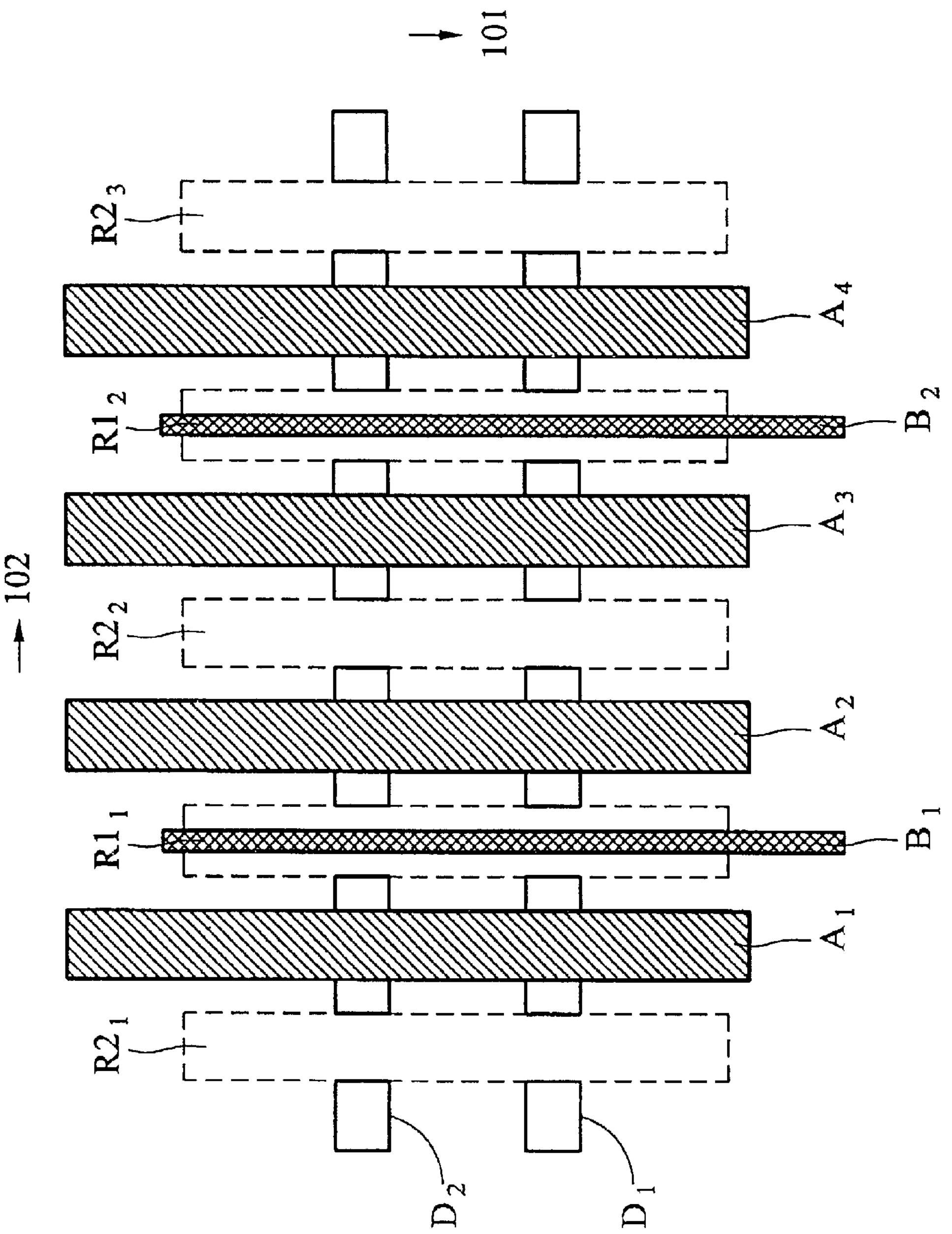
FIG. 3 is a top view illustrating the electrode disposition of the AC plasma display panel of FIG. 2.

FIG. 2 is a perspective schematic diagram of an AC plasma display panel of the present invention. FIG. 3 is a top view of the AC plasma display panel of FIG. 2, showing the layout of electrodes.

In FIG. 2, the AC plasma display panel of the present invention includes a first substrate (front glass substrate) 200; a first electrode ($A_i$, i=1–4) disposed on the first substrate 200 along a first direction 101; a second substrate (rear glass substrate) 202 parallel to the first substrate 201, such that a discharge space is formed between the first substrate 200 and the second substrate 202; a first strip-shaped rib ($R1_j$, j=1–2) and a second strip-shaped rib ($R2_k$, k=1–3) parallel to each other along the first direction 101 and alternatively disposed in the discharge space; and a third electrode ($D_m$, m=1–2) disposed on the second substrate 202 along a second direction 102 approximately perpendicular to the first direction 101.

Referring to FIGS. 2 and 3, it should be noted that the first strip-shaped rib ($R1_1$–$R1_2$) is further provided with a second electrode ($B_1$–$B_2$). The second strip-shaped rib ($R2_1$–$R2_3$) does not have a conductive portion. Any first electrode ($A_1$–$A_4$) is located between the first strip-shaped rib ($R1_j$) and the second strip-shaped rib ($R2_k$), and is not on the same plane with the second electrode ($B_1$–$B_2$).

In addition, the first substrate 200 further includes an inductive layer 204 and a protective layer 206 (such as MgO) to cover the first electrode ($A_i$). In addition, the first electrode ($A_i$) serves as the scanning electrode of AC PDP, the second electrode ($B_j$) the sustaining electrode, and the third electrode the address electrode. Of course, alternatively, the first electrode ($A_i$) can serve as the sustaining electrode, and the second electrode ($B_j$) the scanning electrode.

As described above, the first strip-shaped rib ($R1_1$–$R1_2$) is further provided with a second electrode ($B_1$–$B_2$). FIGS. 4 to 8 show the possible disposition of the second electrode ($B_1$–$B_2$), which are cross-sections taken along line A—A of FIG. 2.

Figure 4:
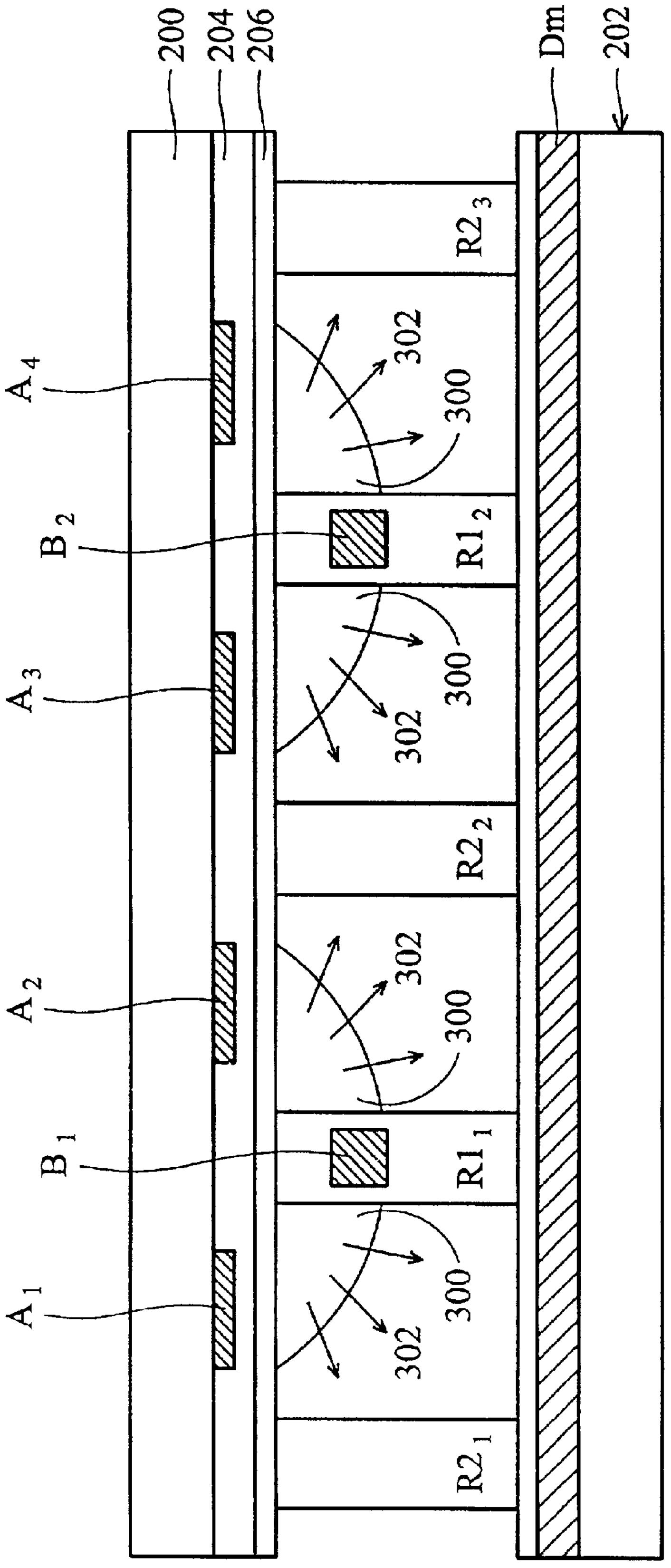
FIG. 4 is a cross-section of the structure of a first embodiment of the present invention.

Referring to FIG. 4, the second electrode ($B_1$–$B_2$) is embedded in the first strip-shaped rib ($R1_1$–$R2_2$) and extends along the first direction 101 as shown in FIG. 2. For simplicity, FIG. 2 only illustrates the disposition of the second electrode ($B_1$–$B_2$) of FIG. 4.

Figure 5:
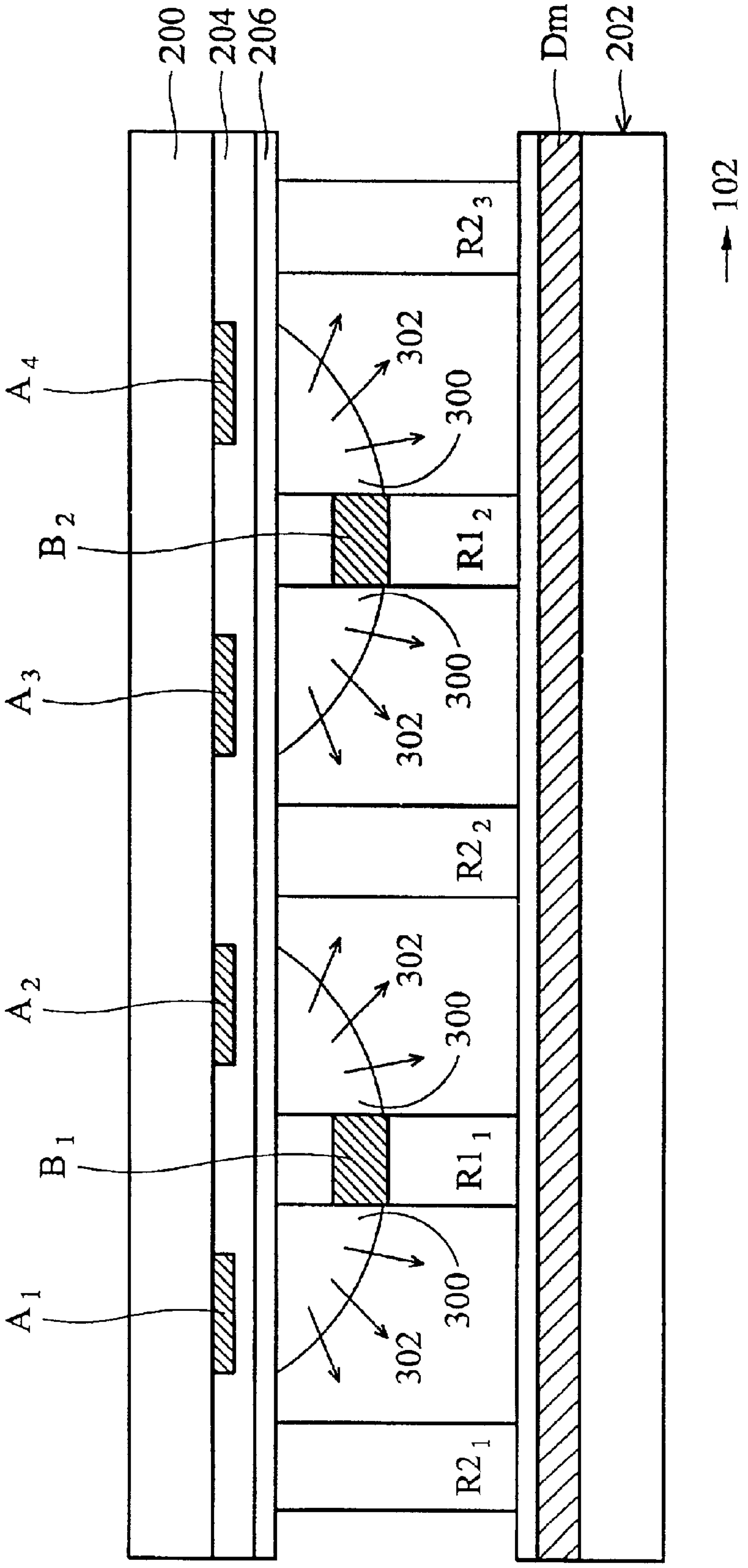
FIG. 5 is a cross-section of the structure of a second embodiment of the present invention.

In addition, the second electrode ($B_1$–$B_2$) of FIG. 4 can further extend along the second direction 102 and expose to the sidewalls of the first strip-shaped rib ($R1_1$–$R1_2$), as shown in FIG. 5.

Figure 6:
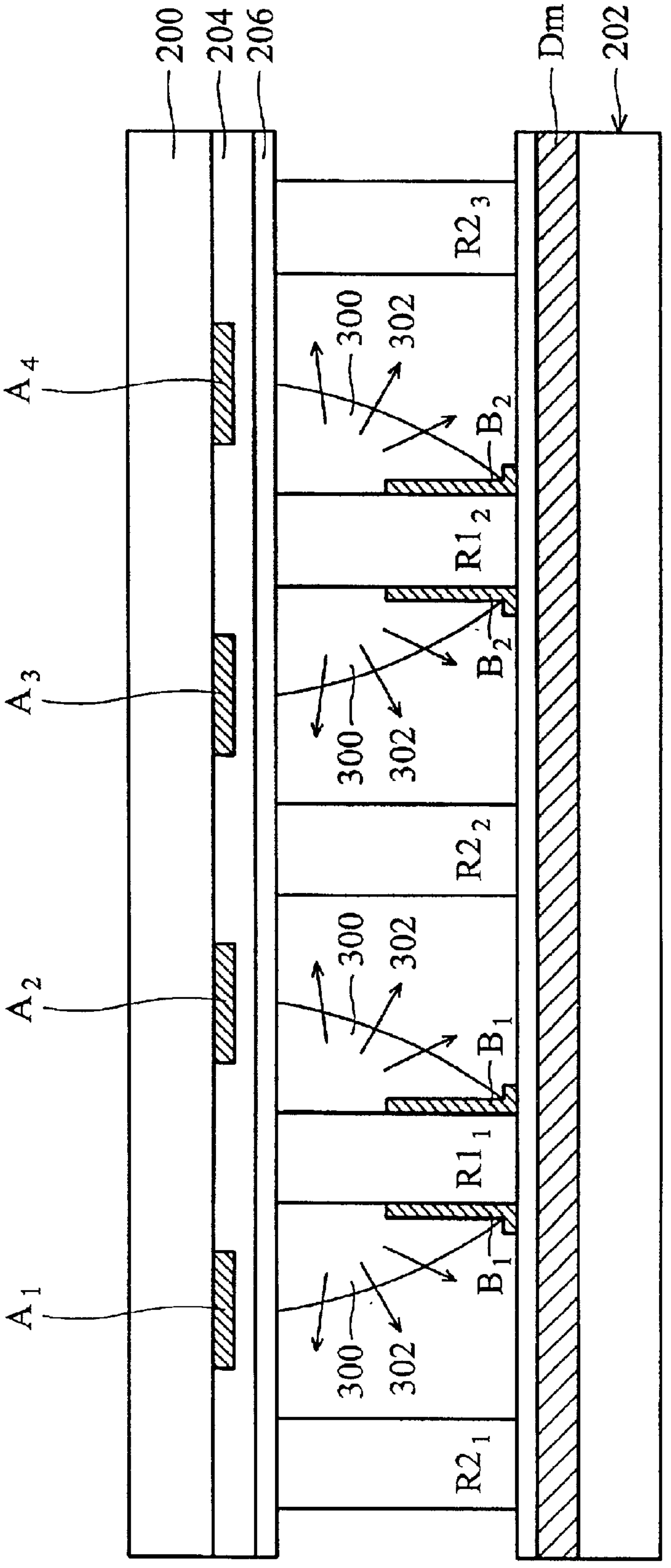
FIG. 6 is a cross-section of the structure of a third embodiment of the present invention.

Referring to FIG. 6, the second electrode ($B_1$–$B_2$) can also be disposed on the sidewalls of the first strip-shaped rib ($R1_1$–$R1_2$), in which the sidewalls are parallel to the first direction 101. Also, the second electrode ($B_1$–$B_2$) extends toward the second substrate 202.

Figure 7:
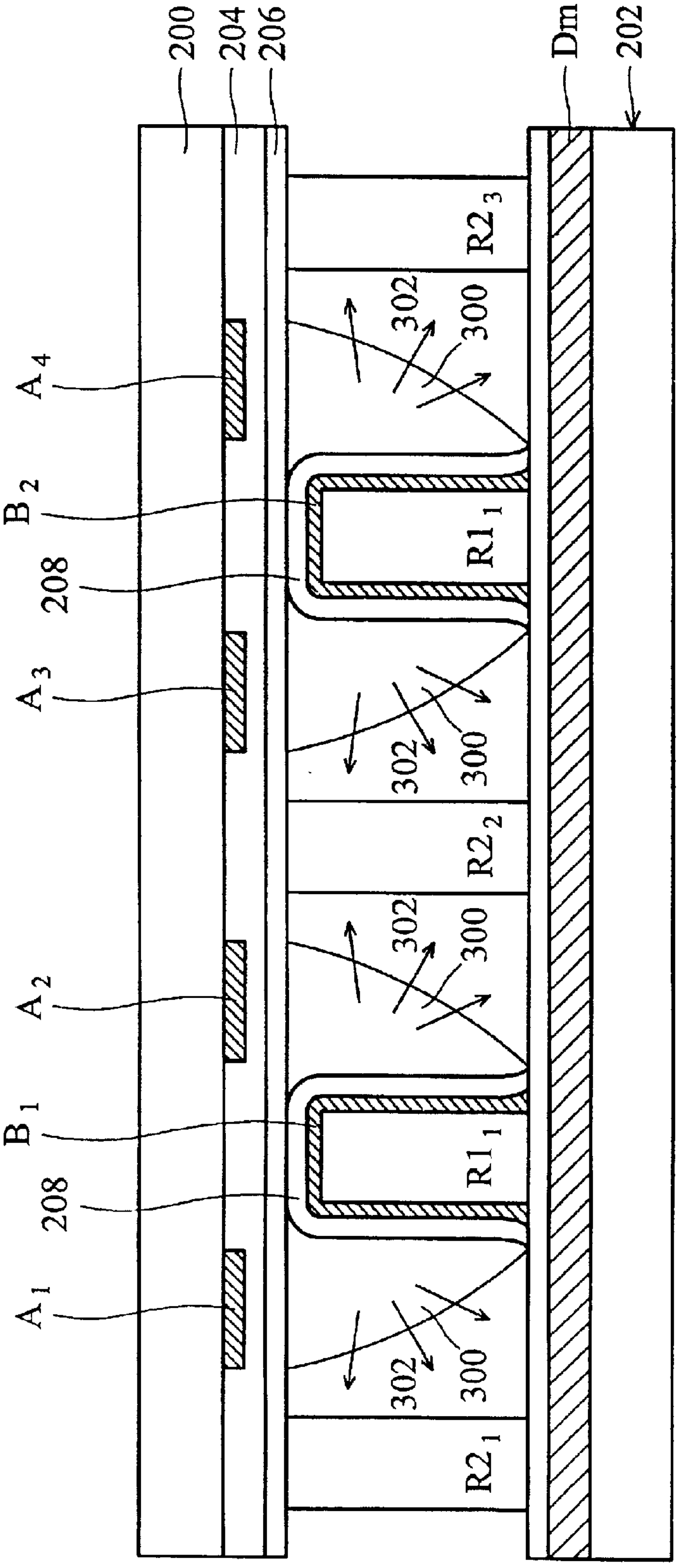
FIG. 7 is a cross-section of the structure of a fourth embodiment of the present invention.

FIG. 7 shows another disposition of the second electrode ($B_1$–$B_2$). The second electrode ($B_1$–$B_2$) covers the first strip-shaped rib ($R1_1$–$R1_2$). An isolating layer 208 covers the second electrode ($B_1$–$B_2$).

Figure 8:
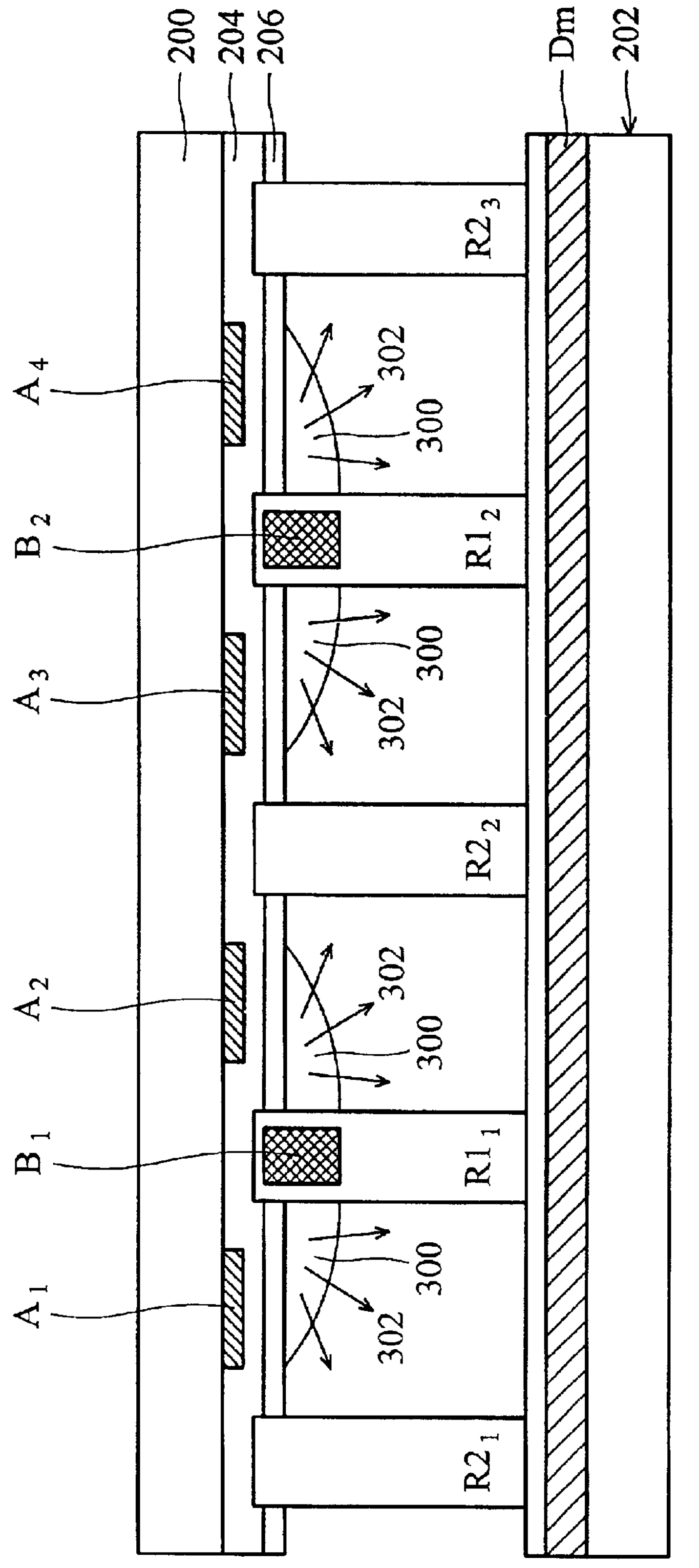
FIG. 8 is a cross-section of the structure of a fifth embodiment of the present invention.

FIG. 8 shows another disposition of the second electrode ($B_1$–$B_2$). A recess is disposed between any two of the first electrodes ($A_i$) on the first substrate 200 and the recess extends along the first direction 101. The recess accommodates the first strip-shaped rib ($R1_j$) and the second strip-shaped rib ($R2_k$). The first strip-shaped ribs ($R1_1$–$R1_2$) and the second strip-shaped ribs ($R2_1$–$R2_3$) are inserted in the recess. It should be noted that the second electrode ($B_1$–$B_2$) is embedded in the top portion of the first strip-shaped rib ($R1_1$–$R1_2$). When the first strip-shaped rib ($R1_1$–$R1_2$) is inserted in the first substrate 200, a part of the second electrode ($B_1$–$B_2$) is also inserted in the first substrate 200 (in FIG. 8, inserted in the inductive layer 204 and protective layer 206). The first electrode ($A_1$–$A_4$) and the second electrode ($B_1$–$B_2$) are still not on the same plane.

Figure 9:
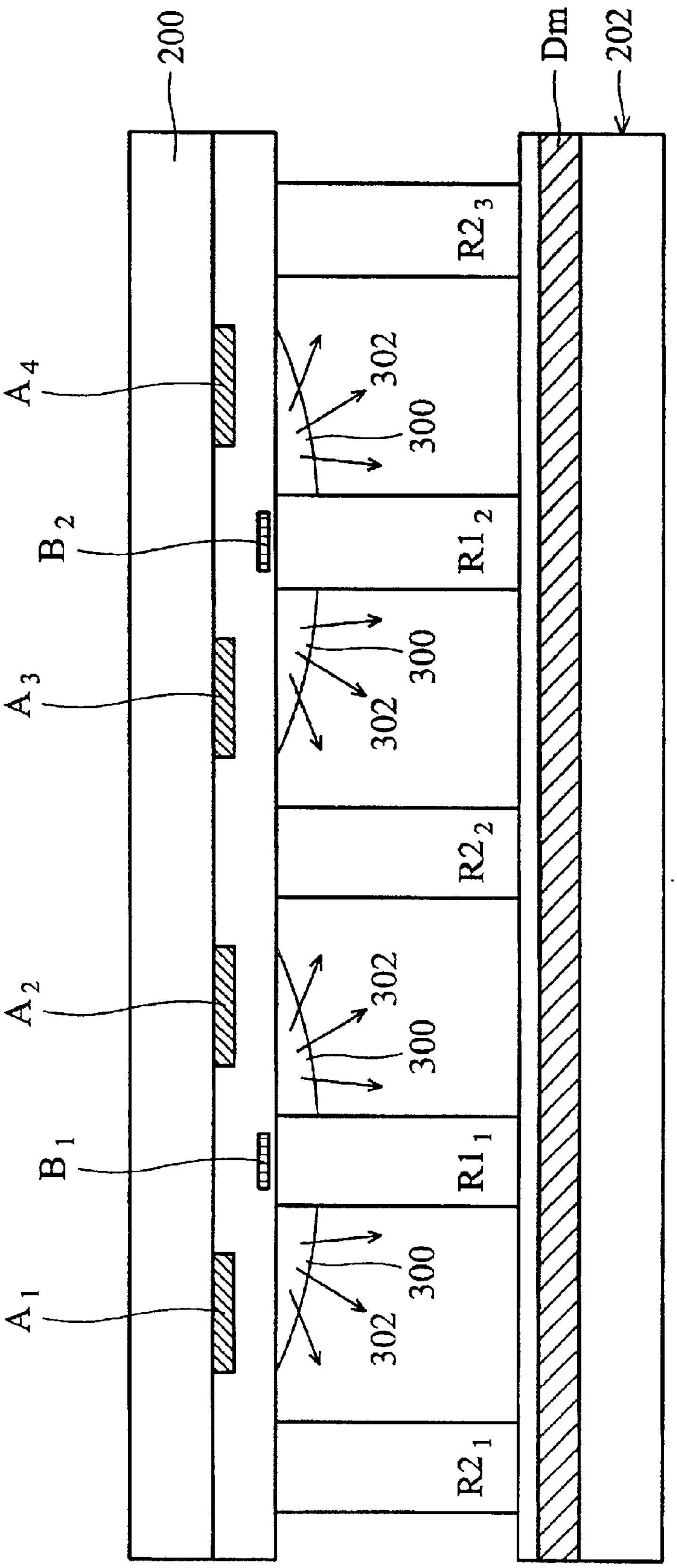
FIG. 9 is a cross-section of the structure of a sixth embodiment of the present invention.

In the above-mentioned AC PDPs shown in FIGS. 4 to 8, the second electrode ($B_j$) is not disposed on the first substrate 200 as the first electrode ($A_j$). However, FIG. 9 shows a structure in which both the second electrode ($B_j$) and the first electrode ($A_j$) are disposed on the first substrate 200. The perspective view is similar to FIG. 2 and the difference is only on the location of the second electrode ($B_j$). Therefore, the perspective view is omitted here.

The AC plasma display panel of FIG. 9 includes a first substrate 200; a first electrodes ($A_i$, i=1–4) disposed on the first substrate 200 along the first direction 101; a second substrate 202 parallel to the first substrate 201, such that a discharge space is formed between the first substrate 200 and the second substrate 202; a first strip-shaped rib ($R1_j$, j=1–2) and a second strip-shaped rib ($R2_k$, k=1–3) parallel to each other along the first direction 101 and alternatively disposed in the discharge space; a second electrode ($B_1$–$B_2$) disposed in the first substrate 200 along the first direction 101, on the corresponding location of the first strip-shaped rib ($R1_1$–$R1_2$), and not on the same plane as the first electrode ($A_1$–$A_4$); and a third electrode ($D_1$–$D_2$) disposed on the second substrate 202 along a second direction 102 perpendicular to the first direction 101.

Figure 10:
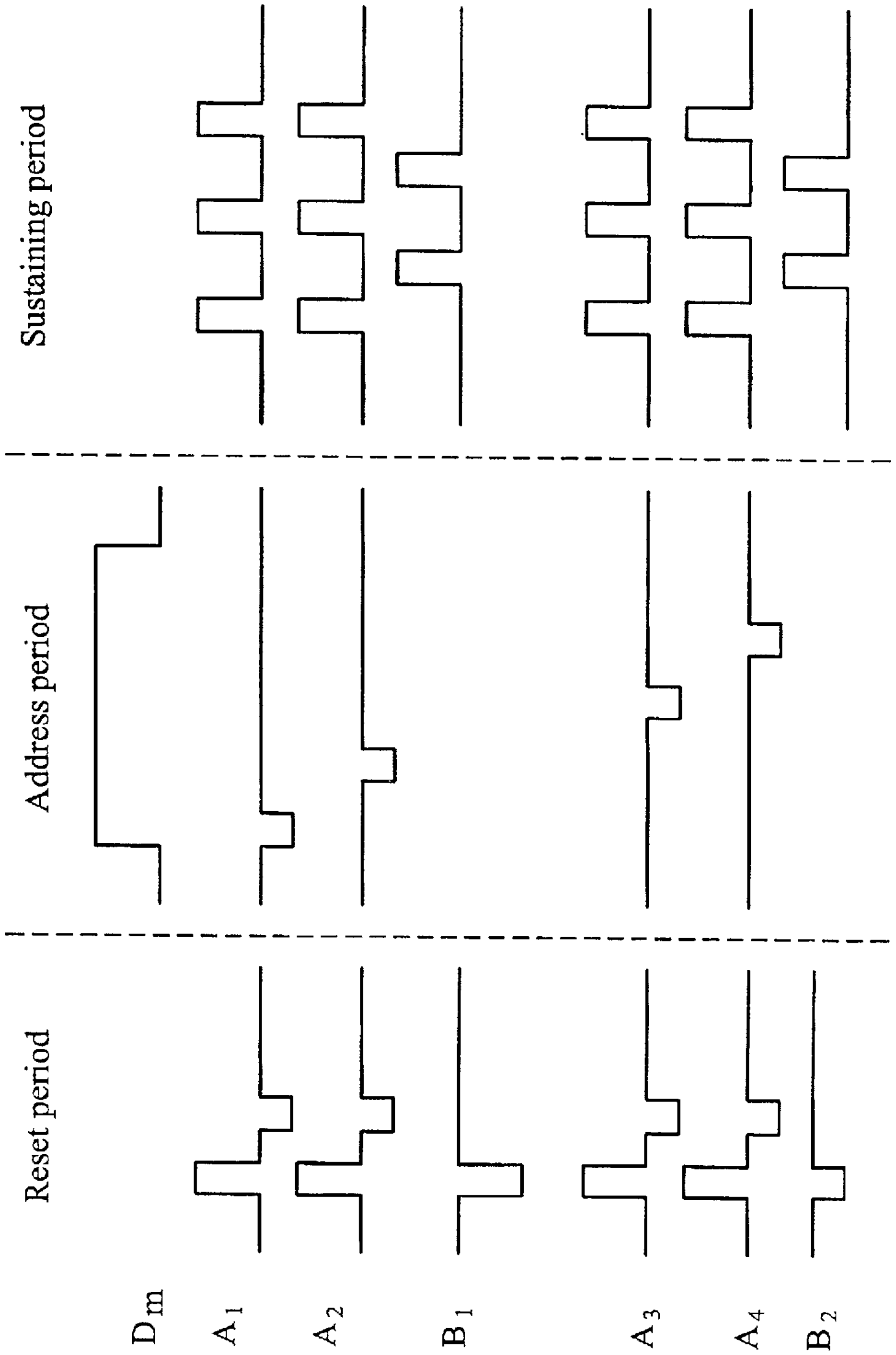
FIG. 10 shows the timing charts of driving signal during every operating period of the AC plasma display panel of the present invention.

FIG. 10 shows the timing charts of driving signal during the reset period, address period, and sustaining period of the AC PDP of the present invention. It should be noted that during the reset and sustaining periods, bias is applied to $A_1$-$B_1$-$A_2$ and $A_3$-$B_2$-$A_4$ respectively. That is, the first electrodes $A_1$ and $A_2$ both use the second electrode $B_1$ and the first electrodes $A_3$ and $A_4$ both use the second electrode $B_2$. Therefore, the overall number of the second electrodes (sustaining electrodes) can be decreased to half compared to the conventional AC PDP.

Moreover, the above embodiments (FIGS. 4 to 9) show that the second electrode ($B_1$–$B_2$) and the first electrode ($A_1$–$A_4$) are not located on the same plane. Therefore, during the sustaining period of the AC PDP of the present invention, driving voltage is applied to the first and second electrodes, plasma (also referred to plasma discharge region) 300 is generated between the first and second electrodes and inclines by a predetermined angle relative to the first substrate 200. Therefore, the ultraviolet ray 302 generated by surface discharge of plasma 300 can spread in the discharge space more deeply onto the fluorescent body (not shown). This excites the fluorescent body to emit visible light more effectively, thus increasing the visible light emission efficiency of AC PDP.

Moreover, in the AC PDP of the present invention, only one first electrode is disposed between any two ribs. Thus, compared with the conventional AC PDP, the dark region is decreased, thus increasing the aperture ratio of AC PDP.

According to the present invention, the first and second electrodes are disposed on different planes. Therefore, it is very easy to adjust the gap between Y electrode (the first electrode) and X electrode (the second electrode), by simply, for example, adjusting the height of the second electrode.

Moreover, in the present invention, either Y electrode (the first electrode) or X electrode (the second electrode) is embedded in the rib. This does not limit the gap between Y and X electrodes and the process tolerance can be looser, which is beneficial to the high precision AC PDP fabrication.

The sustaining electrode (the second electrode) is embedded in the rib. Thus, an opaque electrode with high conductive coefficient, such as Ag electrode, can be used. This can effectively lower the resistance and decrease energy loss of the panel.

The ribs and the second electrodes can be fabricated together. For example, paste is formed into ribs and Ag paste is formed into the second electrodes respectively. The ribs and second electrodes are then subjected to pattern printing, sandblasting using the same mask, and finally heat treatment. The fabrication process is very easy.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An AC plasma display panel, comprising:

a first substrate;

a first electrode ($A_i$) disposed on the first substrate along a first direction;

a second substrate disposed parallel to the first substrate, such that a discharge space is formed between the first substrate and the second substrate;

a first strip-shaped rib ($R1_j$) and a second strip-shaped rib ($R2_k$) parallel to each other along the first direction and alternatively disposed in the discharge space, wherein the first strip-shaped rib ($R1_j$) is provided with a second electrode ($B_j$), the second strip-shaped rib ($R2_k$) does not have a conductive portion, and the first electrode ($A_i$) is located between the first strip-shaped rib ($R1_j$) and the second strip-shaped rib ($R2_k$) and is not located on the same plane as the second electrode ($B_j$); and a third electrode ($D_m$) disposed on the second substrate along a second direction approximately perpendicular to the first direction, wherein when the AC plasma display panel undergoes sustaining discharge, the sustaining discharge is achieved by biasing the second electrode ($B_j$) and two adjacent first electrodes ($A_i$), and plasma is generated with a predetermined inclined angle relative to the first substrate.

2. The AC plasma display panel as claimed in claim 1, wherein the second electrode ($B_j$) is embedded in the first strip-shaped rib ($R1_j$) and extends along the first direction.

3. The AC plasma display panel as claimed in claim 2, wherein the second electrode ($B_j$) extends along the second direction to expose to the sidewalls of the first strip-shaped rib ($R1_j$).

4. The AC plasma display panel as claimed in claim 1, wherein the second electrode ($B_j$) is disposed on the sidewalls of the first strip-shaped rib ($R1_j$), in which the sidewalls are parallel to the first direction, and the second electrode ($B_j$) extends toward the second substrate.

5. The AC plasma display panel as claimed in claim 1, wherein the second electrode ($B_j$) covers the first strip-shaped rib ($R1_j$).

6. The AC plasma display panel as claimed in claim 5, further comprising an isolation layer to cover the second electrode ($B_j$).

7. The AC plasma display panel as claimed in claim 2, wherein a recess is disposed between any two of the first electrodes ($A_i$) on the first substrate and the recess extends along the first direction, and wherein the recess accommodates the first strip-shaped rib ($R1_j$) and the second strip-shaped rib ($R2_k$).

8. The AC plasma display panel as claimed in claim 7, wherein a part of the second electrode ($B_j$) is inserted into the first substrate.

9. An AC plasma display panel, comprising:

a first substrate;

a first electrode ($A_i$) disposed on the first substrate along a first direction;

a second substrate disposed parallel to the first substrate, such that a discharge space is formed between the first substrate and the second substrate;

a first strip-shaped rib ($R1_j$) and a second strip-shaped rib ($R2_k$) parallel to each other along the first direction and alternatively disposed in the discharge space, wherein the first electrode ($A_i$) is located between the first strip-shaped rib ($R1_j$) and the second strip-shaped rib ($R2_k$);

a second electrode ($B_j$) disposed in the first substrate along the first direction, on the corresponding location of the first strip-shaped rib ($R1_j$), and not on the same plane as the first electrode ($A_i$); and a third electrode ($D_m$) disposed on the second substrate along a second direction approximately perpendicular to the first direction, wherein when the AC plasma display panel undergoes sustaining discharge, the sustaining discharge is achieved by biasing the second electrode ($B_j$) and two adjacent first electrodes ($A_i$), and plasma is generated with a predetermined inclined angle relative to the first substrate.

* * * * *